(12) United States Patent
Ladouceur (10) Patent No.: US 7,425,111 B2
(45) Date of Patent: Sep. 16, 2008

(54) TORQUE RESISTANT FASTENING ELEMENT

(75) Inventor: Harold A. Ladouceur, Livonia, MI (US)

(73) Assignee: Whitesell International Corporation, Taylor, MI (US)

( * ) Notice: Subject to any disclaimer, the term of this patent is extended or adjusted under 35 U.S.C. 154(b) by 448 days.

(21) Appl. No.: 10/961,803

(22) Filed: Oct. 8, 2004

(65) Prior Publication Data

US 2005/0158143 A1 Jul. 21, 2005

Related U.S. Application Data

(63) Continuation-in-part of application No. 10/714,265, filed on Nov. 14, 2003, now abandoned, and a continuation-in-part of application No. 10/271,480, filed on Oct. 16, 2002, now Pat. No. 7,179,034.

(51) Int. Cl.
*F16B 37/04* (2006.01)

(52) U.S. Cl. ........................ 411/181; 411/501; 411/179; 411/107; 29/432.1; 29/432.2

(58) Field of Classification Search ....................... None
See application file for complete search history.

(56) References Cited

U.S. PATENT DOCUMENTS

| | | | |
|---|---|---|---|
| 2,707,322 A | 5/1955 | Strain et al. | |
| 4,555,838 A | 12/1985 | Müller | 29/432.1 |
| 4,810,143 A | 3/1989 | Muller | 411/181 |
| 5,020,950 A | 6/1991 | Ladouceur | 411/107 |
| 5,056,207 A | 10/1991 | Ladouceur | 29/432.2 |
| 5,092,724 A | 3/1992 | Muller | 411/179 |
| 5,140,735 A | 8/1992 | Ladouceur | 29/243.522 |
| 5,237,733 A * | 8/1993 | Ladouceur et al. | 29/432.2 |
| 5,644,830 A | 7/1997 | Ladouceur et al. | 29/432.2 |
| 5,868,535 A * | 2/1999 | Ladouceur | 411/181 |
| 6,122,816 A * | 9/2000 | Ladouceur | 29/509 |
| 2005/0025605 A1* | 2/2005 | Vrana et al. | 411/181 |

* cited by examiner

*Primary Examiner*—Jack W. Lavinder (57) ABSTRACT

A torque resistant self-attaching fastener having a tubular barrel portion and a radial flange portion including a plurality of circumferentially spaced radial projections each having opposed planar generally radial side faces with the outer surface of the radial flange between the radial projections having a greater circumferential width than a circumferential width of the radial projections and a radial length less than the circumferential width. The side faces may be aligned with a radius, the side faces may be parallel or the side faces of adjacent radial projections may be parallel.

25 Claims, 7 Drawing Sheets

TORQUE RESISTANT FASTENING ELEMENT

RELATED APPLICATIONS

This application is a continuation-in-part application of U.S. Ser. No. 10/714,265 filed Nov. 14, 2003 now abandoned and Ser. No. 10/271,480 filed Oct. 16, 2002 now U.S. Pat. No. 7,179,034.

FIELD OF THE INVENTION

This invention relates to a fastener or fastening element having a tubular barrel portion and an integral radial flange portion opposite the free open end of the tubular barrel portion for attachment to a metal panel, wherein the tubular barrel portion is deformed to form a mechanical interlock with the panel. More specifically, this invention relates to a fastener element having a plurality of circumferentially spaced radial projections on the radial flange portion to improve the torque resistance of the fastener element following installation in a panel.

BACKGROUND OF THE INVENTION

Self-piercing and clinching fasteners, such as nuts, were developed by a predecessor in interest of the Applicant (Multifastener Corporation) more than 50 years ago as disclosed, for example, in U.S. Pat. No. 2,707,322. Self-piercing and clinching nuts are attached to a metal panel typically in a die press which may also be used to simultaneously form the panel, wherein an installation head is typically attached to the upper die platen of the die press and a die member or die button is attached to the lower die platen of the die press. In the case of a self-piercing nut, a projecting pilot portion pierces an opening in the panel upon closing of the die press and a projecting pilot portion of the pierce nut is then received through the pierced panel opening and clinched to the panel. The same fastener may be utilized as a clinch nut by preforming an opening or prepiercing the panel. The term "self-attaching" fastener is utilized herein as generic to self-piercing and self-clinching fasteners.

More recently, self-attaching male and female fasteners were developed having a tubular barrel portion and a radial flange portion as disclosed, for example, in U.S. Pat. No. 4,555,838 also assigned to the predecessor in interest of the Applicant. The self-attaching fasteners disclosed in this patent include a tubular barrel portion and a radial flange portion that is integral with the tubular barrel portion opposite the free open end of the tubular barrel portion. The self-attaching male fasteners are installed in a die press as described above, wherein the lower die platen typically includes a die button having a panel supporting surface, a central die post, and an annular die cavity surrounding the central die post. The annular die cavity includes a semicircular annular bottom surface, a radial lip portion at an outer extent of the semi-circular bottom surface, and a generally frustoconical surface extending from the radial lip portion to the end surface of the die button. In certain applications, however, it is preferable to eliminate the outer frustoconical surface and the radial lip portion as disclosed in the above-referenced U.S. patent application Ser. No. 10/714,265.

It is important in most applications of self-attaching fasteners to prevent rotation of the fastener relative to the metal panel in which it is installed. As will be understood, the self-attaching fastener element may be a male fastener having an integral shank portion or a female fastener having a bore and, following attachment of the fastener element to a panel, a second fastener is threaded onto or into the self-attaching fastener element of this invention, typically with a torque wrench. Thus, the self-attaching fastener must be able to withstand the torque applied to the fastener during attachment of a second fastener to the self-attaching fastener. Further, in certain applications, additional torque may be applied to the self-attaching fastener depending upon the application.

Various attempts have been made to improve the torque resistance of self-attaching fasteners of the type disclosed in the above-referenced U.S. Pat. No. 4,555,838. Initially, anti-rotation protrusions or nubs were provided either on the barrel portion or on the radial flange portion adjacent the barrel portion as disclosed, for example, in U.S. Pat. No. 4,810,143, also assigned to the assignee of the predecessor in interest of the assignee of this application. U.S. Pat. No. 5,020,950, also assigned to the predecessor in interest of the assignee of this application, discloses a self-attaching fastener element of the type disclosed herein having a plurality of spaced pockets in the outer edge of the flange portion adjacent the barrel portion. There remains, however, several problems associated with the use of pockets in the flange as disclosed in U.S. Pat. No. 5,020,950, including wear of the die surfaces which form the pockets, such that the pockets are not always fully formed in the flange portion resulting in insufficient torque resistance. Second, the self-attaching fastener and panel assembly is press sensitive. That is, the panel metal may not be fully deformed into the pockets and thus the torque resistance will be inadequate. Further, the pockets form stress risers in the panel which can become a source of failure of the fastener and panel assembly. Finally, the use of pockets in the flange portion may provide insufficient torque resistance, particularly where extreme torque resistance is required.

Further attempts to solve this problem are disclosed in U.S. Pat. No. 5,868,535, also assigned to the predecessor in interest of the assignee of this application. This patent discloses a radial flange portion having a radial surface defining spaced concave surfaces separated by an outer cylindrical surface. During installation of the self-attaching fastener element in the panel, the barrel portion is deformed radially outwardly and upwardly to provide a U-shaped channel that receives the edge of the panel adjacent the opening in the panel. The radial flange portion deforms the panel downwardly into the U-shaped channel, thereby securing the self-attaching fastener element to the panel. The outer cylindrical surfaces further deform the panel providing an interaction between the radial flange portion and the panel which increases the torque resistance of the fastener element in the panel. Although the arcuate design of the radial flange portion disclosed in U.S. Pat. No. 5,868,535 increases the torque resistance and the arcuate configuration is beneficial to deforming the panel due to the smooth transition of its arcuate shape, the torque resistance provided by this self-attaching fastener is still insufficient for certain applications.

Finally, U.S. Pat. No. 5,644,830, also assigned to the predecessor in interest of the assignee of this application, discloses self-attaching fastener elements for forming an electrical connection between the fastener and a metal panel, wherein the disclosed embodiments (FIGS. 15 to 19) include radial projections which bite into the metal panel during installation to form an electrical contact between the fastener and the metal panel. As will be understood, the disclosed embodiments of the radial projections will provide some improvement in torque resistance. However, the configuration of the radial teeth disclosed in this patent will shear the panel under the torque load encountered in many applications. There remains, therefore, a long felt need to provide improved torque resistance for self-attaching fasteners of the type disclosed herein which is provided by the self-attaching fastener element of this invention, particularly self-attaching fastener elements including a tubular barrel portion and a radial flange portion, wherein the tubular barrel portion is deformed to form a mechanical interlock during installation of the fastener element in a metal panel.

SUMMARY OF THE INVENTION

As set forth above, the self-attaching fastener element of this invention includes a tubular barrel portion having a free open end a radial flange portion integral with the tubular barrel portion opposite the free open end. The self-attaching fastener of this invention may be a male fastener having a shank portion integral with the radial flange portion, wherein the shank portion may be threaded, or a female fastener having a bore through the radial flange portion coaxially aligned with the tubular barrel portion, wherein the bore may be internally threaded. The fastener element of this invention may also be utilized as a self-piercing fastener, wherein the panel is pierced during installation and the barrel portion is received through the pierced panel opening and deformed in a die button to form a mechanical interlock between the self-attaching fastener and the panel or the panel may be prepierced and the barrel portion is clinched to the panel as described above.

The outer surface of the radial flange portion of the self-attaching fastener element of this invention includes a plurality of circumferentially spaced radial projections each including an outer surface having a diameter greater than the tubular barrel portion and the panel is incrementally deformed radially inwardly into the recesses between the radial projections by the die button during installation and thus provide torque resistance. In a preferred embodiment of the self-attaching fastener element of this invention, the outer surface of the radial flange portion between the circumferentially spaced radial projections has a greater circumferential width than a circumferential width of the outer surface of the radial projections providing further improved torque resistance as the panel is deformed between the circumferentially spaced radial projections. In a more preferred embodiment of the self-attaching fastener element of this invention, the circumferential width of the radial flange portion between the circumferentially spaced radial projections is at least twice the circumferential width of the outer surface of the radial projection, providing further improved torque resistance. Further, in a preferred embodiment of the self-attaching fastener element of this invention, the circumferentially spaced radial projections each include opposed planar generally radial side surfaces extending from the outer surface of the radial flange portion to the outer surface of the circumferentially spaced radial projections, such that the side walls are generally perpendicular to a circumferential rotation about the longitudinal axis of the tubular barrel portion and the radial flange portion, providing optimal torque resistance as torque is applied to the fastener element following installation. That is, the planar generally radial side surfaces or faces of the circumferentially spaced radial projections is generally perpendicular to the torsional force applied to the self-attaching fastener element, providing optimal torque resistance. However, the circumferentially spaced radial projections may still sheer under extreme torsional load and thus in a preferred embodiment of the self-attaching fastener element of this invention, the circumferential width of the outer surface of the radial projections is greater than the radial length of the radial projections and in a more preferred embodiment, the circumferential width of the outer surface of the radial projections is at least twice the radial length, providing improved strength for the radial projections under torsional load.

This application discloses three embodiments of the self-attaching fastener element of this invention. In the first disclosed embodiment, the radial projection of the planar generally radial side surfaces of the circumferentially spaced radial projections extend through the longitudinal axis of the radial flange portion. In the second preferred disclosed embodiment of the self-attaching fastener of this invention, the opposed planar generally radial side surfaces of adjacent circumferentially spaced radial projections are parallel forming channel-shaped recesses between the adjacent circumferentially spaced radial projections. In the third disclosed embodiment of the self-attaching fastener element of this invention, the opposed planar generally radial side faces of each of the circumferentially spaced radial projections are parallel. As will be understood, the opposed planar radial side faces of each of the disclosed embodiments is generally radial and thus substantially perpendicular to a torsional force applied to the self-attaching fastener following installation in a panel and thus provides significantly improved torsion resistance over the prior art.

Testing of the torque resistance of the self-attaching fasteners of this invention indicates that the force required to turn or rotate the fastener in a metal panel is about twice the force required for the prior art self-attaching fasteners described above and meets or exceeds the specifications provided by the automotive industry for such applications. As will be understood, various modifications may be made to the self-attaching fastener element of this invention within the purview of the appended claims and the following description of the preferred embodiments and the appended drawings are for illustrative purposes only and do not limit the scope of this invention except as set forth in the appended claims.

DESCRIPTION OF THE PREFERRED EMBODIMENTS

As set forth above, this invention relates to improved self-attaching fastener elements having significantly improved torque resistance. As will be understood by those skilled in this art, the drawings illustrate preferred embodiments of the self-attaching fastener element of this invention, but are not limiting except as set forth in the appended claims. Although the figures illustrate that the self-attaching fastener of this invention may be utilized as a self-piercing fastener element, the invention is not limited to self-piercing fasteners and the self-attaching fastener of this invention may also be utilized as a self-clinching fastener, wherein the opening through the panel is prepierced or preformed.

Figure 1:
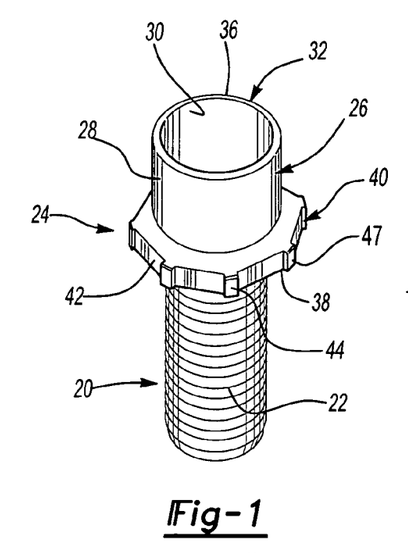
FIG. 1 is an end perspective view of one preferred embodiment of the self-attaching fastener element of this invention.
Figure 2:
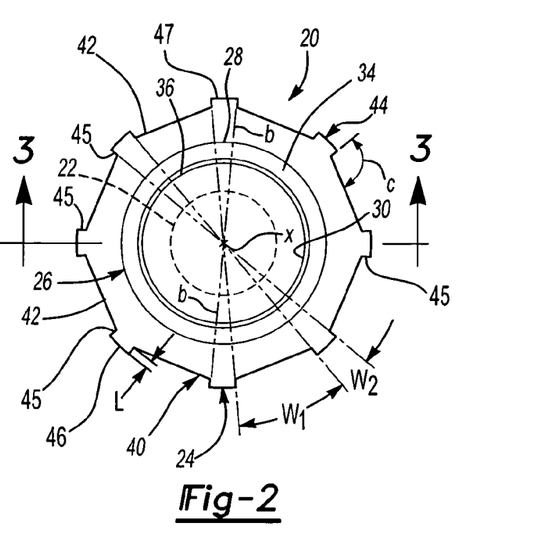
FIG. 2 is an end view of the fastener element shown in FIG. 1.
Figure 3:
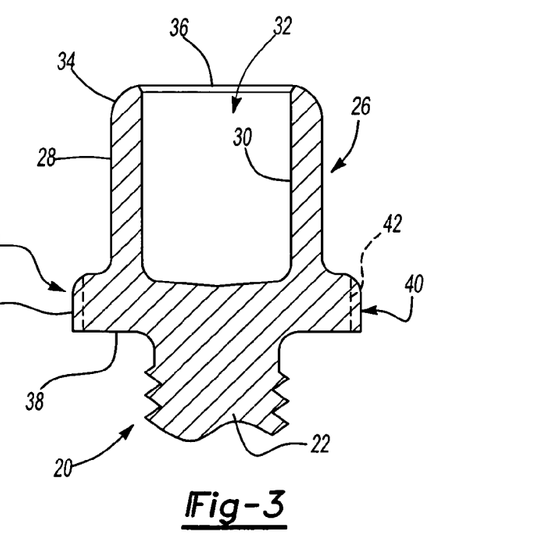
FIG. 3 is a partial side cross-sectional view of the self-attaching fastening element shown in FIGS. 1 and 2.

FIGS. 1 to 3 illustrate a first embodiment of the self-attaching fastener of this invention generally shown at 20 in the form of a male self-attaching fastener having a threaded shank portion 22, although the shank portion may also be unthreaded. In the embodiment of the self-attaching fastener 20 illustrated in FIGS. 1 to 3, the fastener includes a radial flange portion 24 integral with the shank portion 22 and a tubular barrel portion 26 integral with the radial flange portion 24. In a preferred embodiment, the tubular barrel portion 26 is coaxially aligned with the radial flange portion 24 and the shank portion 22 about a longitudinal axis "x" as shown in FIG. 2. In the disclosed embodiment, the tubular barrel portion 26 includes a cylindrical external or outer surface 28 and a cylindrical internal surface 30 as best shown in FIG. 3. The tubular barrel portion includes a free open end 32 opposite the radial flange portion 24 including an arcuate annular outer bearing surface 34 and a chamfered internal surface 36 which interact to pierce a panel 50 shown in FIG. 4 and described below. As described further in the above-referenced U.S. Pat. No. 4,555,838, the chamfered piercing surface 36 centers the fastener on the die button during installation and pierces an opening in the panel having a diameter less than the external diameter of the cylindrical outer surface 28 of the tubular barrel portion 26. As set forth above, however, the embodiments of the self-attaching fastener elements disclosed herein may also be utilized as a self-clinching fastener, wherein the opening through the panel is preformed.

The radial flange portion 24 includes an annular planar bearing surface 38 surrounding the shank portion 22 and an outer circumferential surface 40 circumscribing the planar bearing surface 38. The circumferential outer surface 40 of the radial flange portion of the embodiments of the self-attaching fastener element of this invention further includes a plurality of radial projections 44 extending from the outer surfaces 42 of the radial flange portion between the radial projections 44. In one preferred embodiment, the outer surfaces 42 of the radial flange portion 40 between the radial projections 44 are planar and generally perpendicular to a radius through the longitudinal axis "x" as best shown in FIG. 2. Each of the radial projections 44 include opposed planar generally radial side faces or walls 45 which extend generally perpendicular to a force that is tangential to the circumference of rotation and is thus perpendicular to a torsional force resulting from threading a nut or female fastener on the shank portion 22 following installation of the self-attaching fastener 20 in a panel 50 as described below. In the embodiment of the self-attaching fastener 20 shown in FIGS. 1 to 3, a radial projection of the planar generally radial side surfaces 45 extends through the longitudinal axis "x" as shown by diameter lines "b" in FIG. 2. However, as described below with reference to FIGS. 17 and 18, the planar side faces 45 may also be parallel.

In the embodiment of the self-attaching fastener 20 illustrated in FIGS. 1 to 3, the outer surfaces 46 of the radial projections 44 are cylindrical, but may also be planar. In a preferred embodiment of the self-attaching fastener of this invention, the circumferential width $W_1$ of the outer surface 42 of the radial flange portion 24 between the radial projections 44 is substantially greater than the circumferential width $W_2$ of the outer surface 46 of the radial projections as shown in FIG. 2 and more preferably the circumferential width $W_1$ of the outer surfaces 42 is at least twice the circumferential width $W_2$ of the outer surfaces 46 of the radial projections 44. Further, in a preferred embodiment, the radial length "L" of the radial projections 44 is less than the circumferential width $W_2$ of the radial projections 44 providing additional strength for the radial projections 44, as described above, and in a preferred embodiment, the circumferential width $W_2$ is at least twice the circumferential length L. As shown in FIG. 2, the planar generally radial side faces 45 also define an angle "c" with the planar outer surfaces 42 of the radial flange portion 24 which in this embodiment defines an obtuse angle, such that the planar radial side faces 45 are aligned generally perpendicular to a circumference of rotation about the axis "x" of the tubular barrel portion 26 and the radial flange portion 24. Thus, each planar radial side wall or face 44 provides an optimum resistance to torsional force, preventing rotation of the self-attaching fastener element 20 relative to a panel following installation, as now described.

Figure 4:
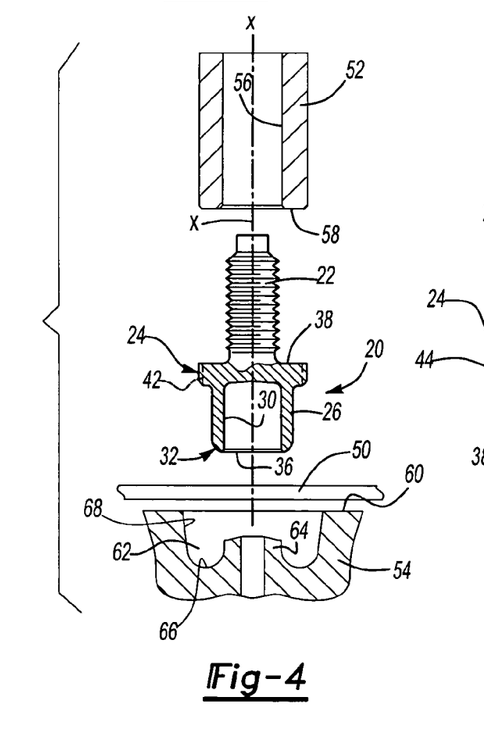
FIG. 4 is an exploded side partially cross-sectioned view of the self-attaching fastener shown in FIGS. 1 to 3 aligned for installation in a panel with a die member and a driving member.

The embodiments of the self-attaching fastener elements of this invention are adapted for mass production applications in a die press, such as used by the automotive industry to install such fasteners in sheet metal parts, including brackets, body panels and the like. Such sheet metal parts may also be simultaneously formed in the die press. One or a plurality of self-attaching elements 20 of this invention may be installed in a sheet metal panel or plate 50 with each stroke of the die press, wherein an upper platen of the die press typically includes an installation head having a reciprocating plunger 52 and a lower die platen includes a female die member or die button 54 as shown in FIG. 4. A suitable installation head is more fully described in the above-referenced U.S. Pat. No. 4,555,838.

The reciprocating plunger 52 shown in FIG. 4 includes a cylindrical bore 56 which receives the shank portion 22 of the self-attaching fastener 20. An annular end or driven surface 58 of the plunger is configured to be received against the planar annular bearing face 38 of the radial flange portion 24 as shown in FIG. 4, et. seq. The female die button 54 disclosed in more detail in FIG. 5 includes a planar end bearing surface 60 which supports the panel 50 during installation of the self-attaching fastener 20 and the panel 50 is preferably clamped to the die button 54 during installation. The die button 54 includes an annular die cavity 62 which, in the disclosed embodiment, includes an annular semi-circular bottom surface or wall 66 and a frustoconical outer side wall 68 extending tangentially from the semi-circular bottom wall 66 to the bearing face 60. In the disclosed embodiment, a radial edge 70 defines an intersection of the bearing face 60 adjacent to the frustoconical outer side wall 68. The frustoconical outer side wall defines a smooth continuous surface extending tangentially from the annular semi-circular bottom surface 66 at an included angle shown in FIG. 5 at "d" which is generally between six and 10 degrees. The radial edge 70 joining the frustoconical outer side wall 68 and the bearing surface 60 preferably includes a radius having a diameter less than about 0.04 inches. An outer surface 76 of the central die post 64 may include staking cavities (not shown) to retain a slug pierced from the panel 50 as disclosed in the above-referenced U.S. Pat. No. 5,056,207. If the self-attaching fastener element 20 is not of the self-piercing type, an aperture (not shown) is formed in the panel 50 prior to installation of the self-attaching fastener in a panel.

Figure 5:
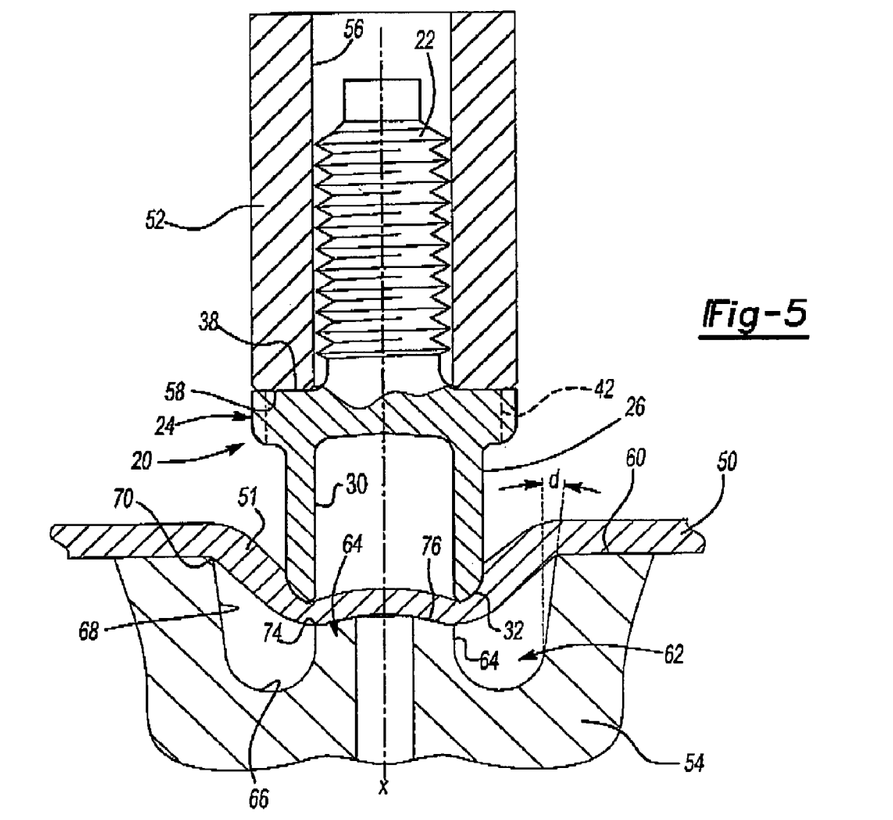
FIG. 5 is a side partially cross-sectioned side view of the self-attaching fastener element shown in FIGS. 1 to 4 during installation of the self-attaching fastener element in a panel.

As shown in FIG. 4, the self-attaching fastener 20, reciprocating plunger 52 and the die button 54 are aligned by the installation apparatus or "head" (not shown) along the longitudinal axis "x" prior to installation. In the method of installation disclosed in FIGS. 5 to 14, the self-attaching fastener 20 is utilized as a self-piercing fastener as now described. FIG. 5 illustrates the initial step in the installation sequence of the self-attaching fastener element 20 in a panel 50. The annular driving end face 58 of the reciprocating plunger 52 is first driven against the annular bearing face 38 of the radial flange portion 24, which drives the free open end 32 of the barrel portion 26 against the panel 50. The force of the free end 32 of the barrel portion 26 against the panel 50 deforms the panel into the die cavity against the end surface 76 of the die post 64 around the radial edge 70 of the open free end 32 of the internal chamfered piercing surface 36 forming a generally frustoconical panel portion 51 in the die cavity 62 as shown in FIG. 5.

Figure 6:
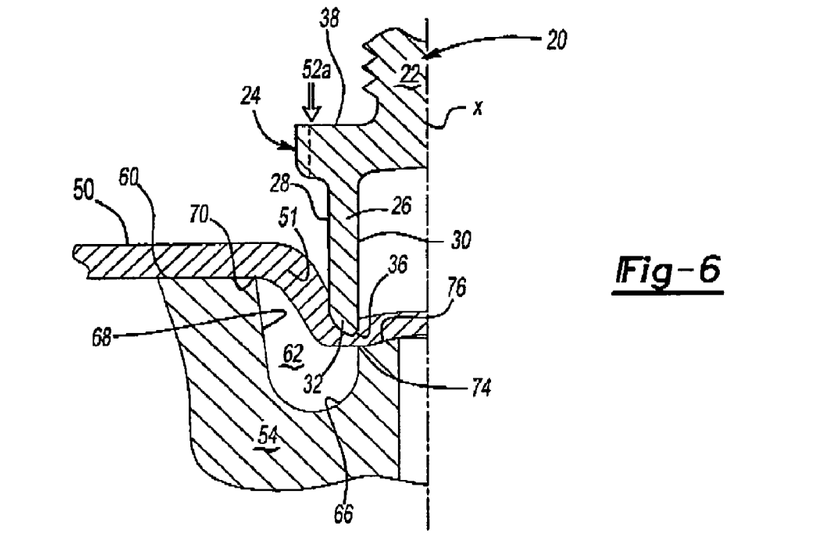
FIGS. 6 to 14 are side cross-sectional views of the self-attaching fastener and die member of FIGS. 1 to 5 illustrating the sequence of installation of the self-attaching fastener element of this invention.
Figure 7:
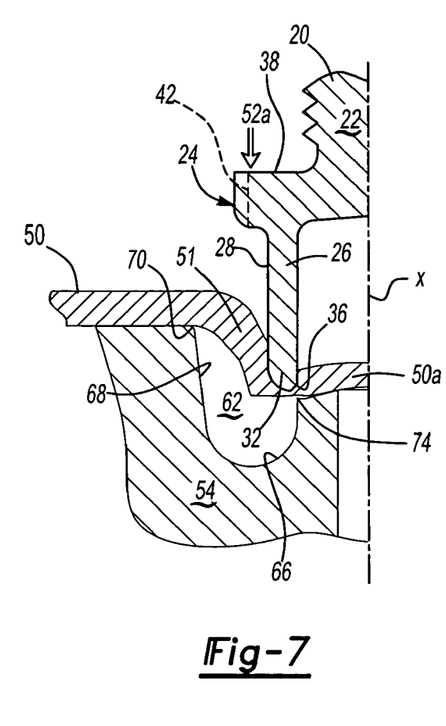
Figure 8:
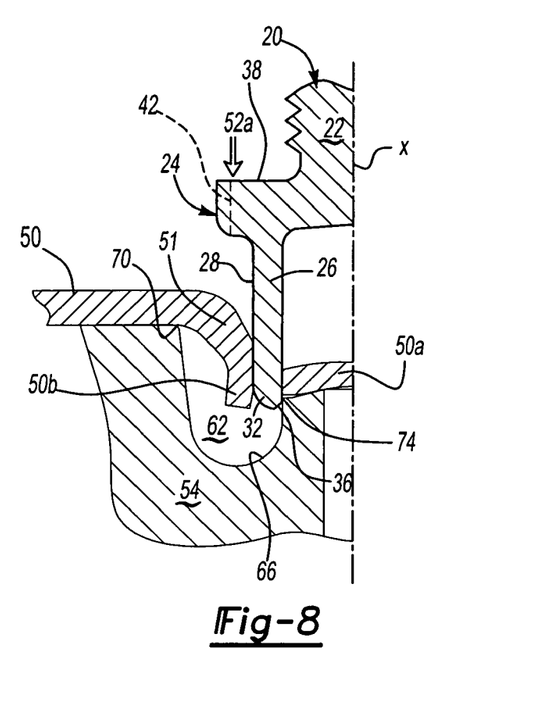
Figure 9:
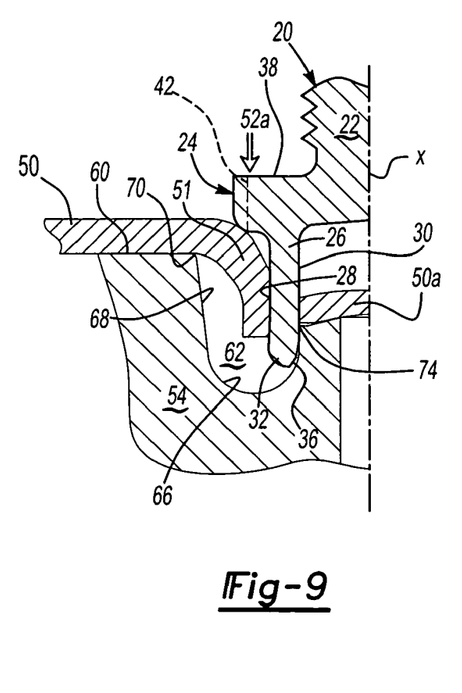
Figure 10:
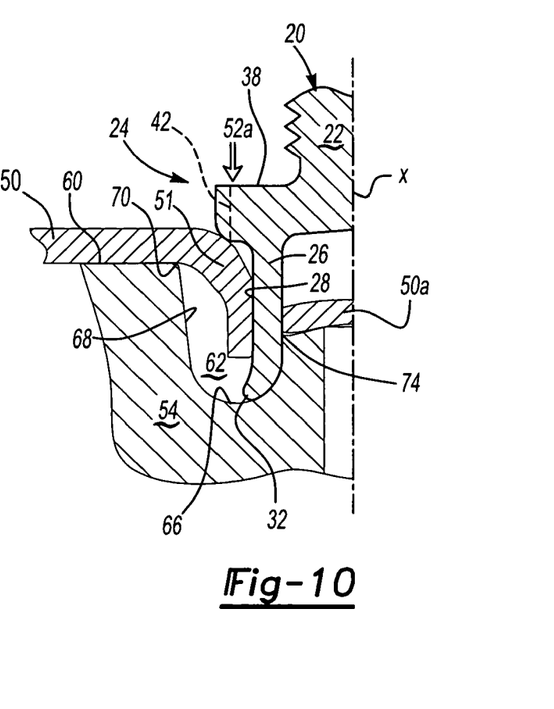
Figure 11:
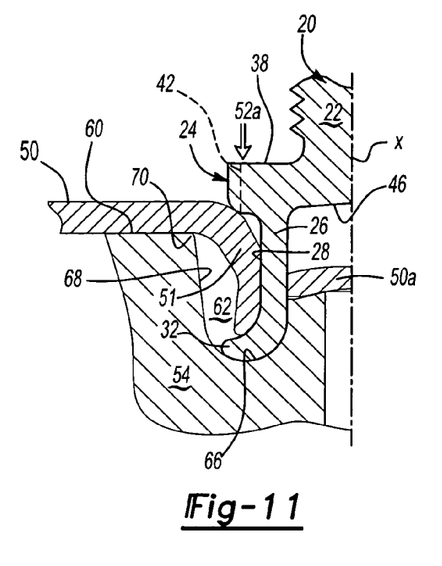
Figure 12:
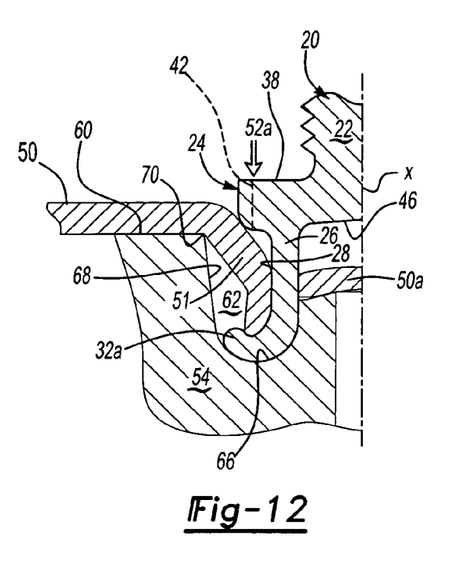

FIGS. 6 to 14 illustrate the sequence of installation of the self-attaching fastening element 20 in the panel, wherein the reciprocating plunger 52 is replaced by an arrow 52a for clarity. As shown in FIG. 2, the chamfered internal piercing surface 36 cuts the panel 50 against a circular outer sharp piercing edge 74 of the central die post 64 as shown in FIGS. 6 and 7 until a circular slug 50a is cut from the panel as shown in FIG. 8. An edge portion of the panel portion 50b adjacent the pierced panel slug 50a is then received against the cylindrical external surface 28 of the tubular barrel portion 26 as shown in FIGS. 8 and 9. Simultaneously, the external surface 28 of the barrel portion 26 draws the panel portion 50b into the annular die cavity 62. The cylindrical internal surface 30 of the tubular barrel portion 26 is then received against the frustoconical outer side wall 68 of the die post 64 as shown in FIG. 9 and sequentially against the semi-circular bottom wall 66 as best shown in FIG. 10. Upon engagement of the open free end 32 of the tubular barrel portion 26 with the semi-circular bottom wall 66, the tubular barrel portion 26 is deformed into a U-shaped annular channel as best shown in FIGS. 10 through 12.

Figure 13:
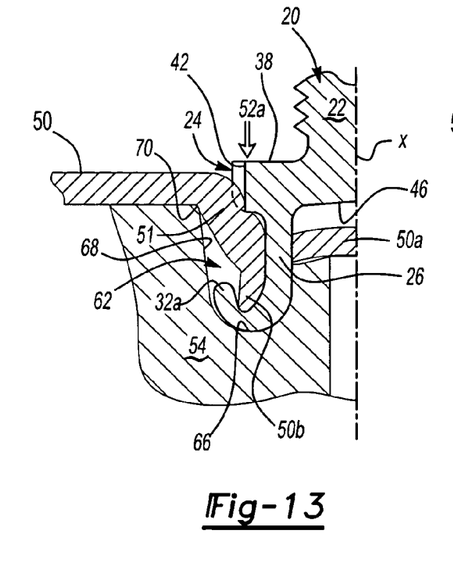
Figure 14:
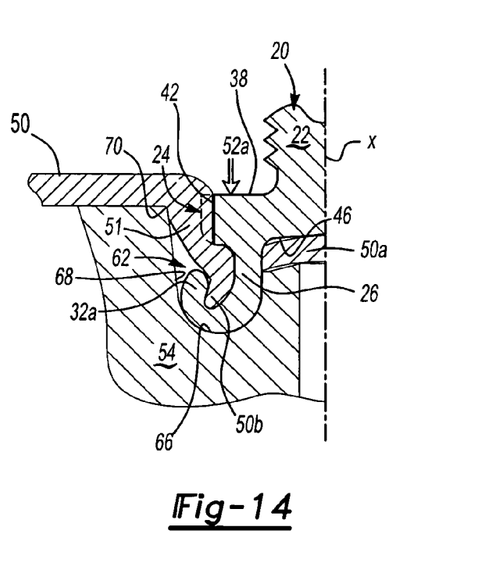

As shown in FIGS. 10 through 12, during the installation of the self-attaching fastener element 20 in a panel 50, the edge portion 50b of the panel 50 remains unsupported in the die cavity 62 and against the outer surface 28 of the tubular barrel portion 26. Further, it should be noted that the radial flange portion 24 is not driven into the edge portion 50b. Therefore, the edge portion 50b remains spaced from the outer side wall 68 of the central die post 64. The edge portion 50b is eventually enclosed within a U-shaped end portion 32a of the now deformed barrel portion 26 as shown in FIGS. 12 and 13. Upon forming of the free end 32 of the annular semi-circular bottom wall 66, the U-shaped free end 32 is spaced from the frustoconical side wall 68 of the die button 54 as shown in FIG. 13.

Figure 15:
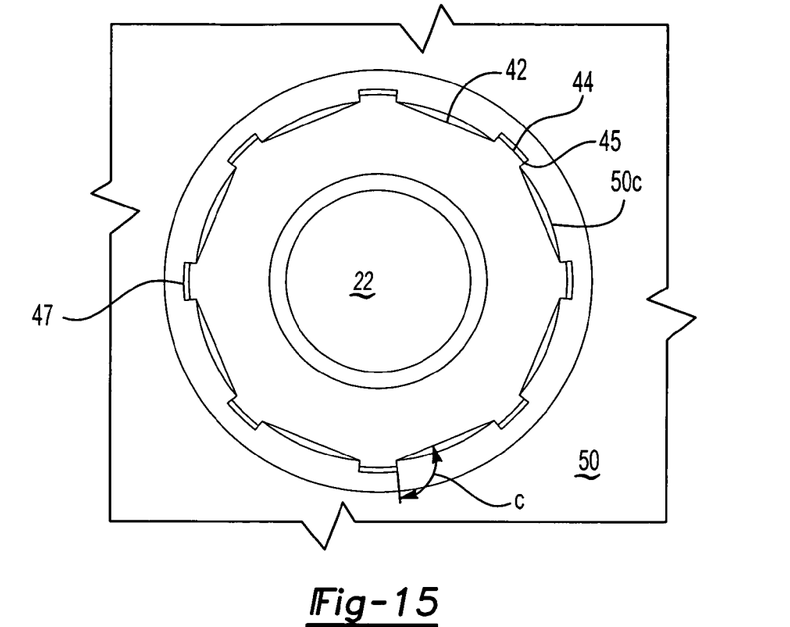
FIG. 15 is a top view of the embodiment of the self-attaching fastener element illustrated in FIGS. 1 to 3 following installation in a panel as shown in FIG. 14.
Figure 16:
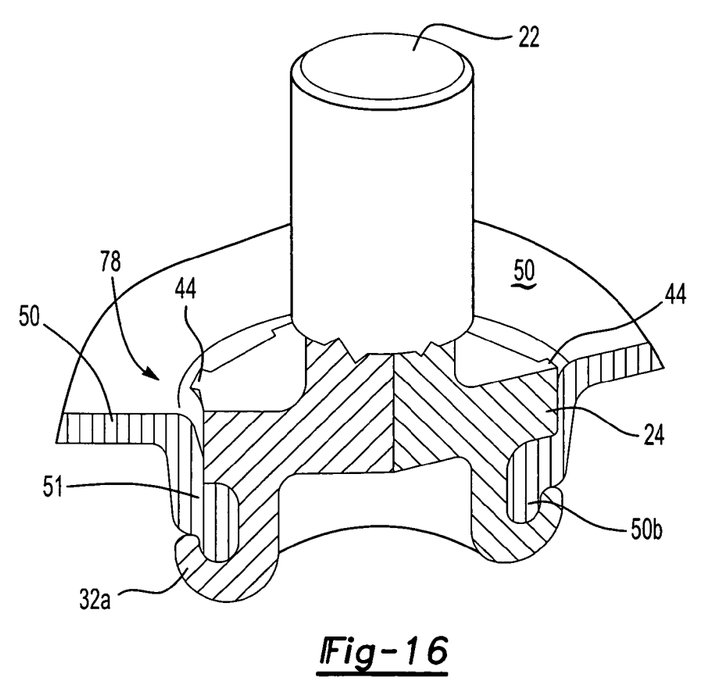
FIG. 16 is a partially cross-sectioned side perspective view of the self-attaching fastener and panel assembly illustrated in FIG. 15.

As shown in the sequence drawings of FIGS. 15 and 16, a panel portion 50c is disposed in the die cavity 62 adjacent the radial edge 70 and is incrementally squeezed between the outer side wall 68 and the adjacent radial edge 70 and the radial flange 24. The panel portion 50c continues to be deformed by the radial edge 70 until the panel portion 50c substantially, but not completely fills the spaces between the radial projections 44 of the radial flange portion 24. Simultaneously, the radial projections 44 deform the panel portion 50c incrementally radially outwardly from the longitudinal axis "x" defined by the radial flange portion 24 and the tubular barrel portion 26. The deformation of the panel is best shown in FIGS. 15 and 16. Referring again to FIG. 14, the radial flange portion 24 is preferably driven into the annular die cavity 62, such that the annular bearing face 38 is spaced slightly below the plane of the panel 50. This is desirable because components attached to the fastening element 20 preferably lie flush against the panel 50. It should be understood, however, that if the installation was designed to have a bearing face 38 flush with the panel, normal tolerance build-up would result in some of the installations having the attachment component disposed above the plane of the panel 50.

As best shown in FIG. 16, the panel portion 50c is squeezed or deformed incrementally radially into the spaces or recesses defined between each of the radial projections 44 or against the planar surfaces 42 shown in FIGS. 1 to 3. In a preferred embodiment, the panel portion 50c substantially, but not completely, fills the space between the radial projections 44 as shown by arrow 78. The frustoconical outer side wall 68 adjacent the planar end bearing surface 60 thus serves as a wedge as the flange portion 24 is driven into the die cavity 62, incrementally deforming the panel portion 50c into the spaces or recesses between the radial projections 44. It should be understood that the radius of the radial edge 70 can be optimized to control the amount of panel portion 50c which substantially fills the space between the radial projections 44. For example, a small radius of the radial edge 70 will deform a larger amount of the panel portion 50c into the space between the radial projections than would a radial edge 70 having a larger radius. Further control of the filling of the panel portion 50c into the recesses is provided by the depth of penetration of the radial flange portion 24 into the panel portion 51 which is a function of the die press setting and the die button.

Figure 17:
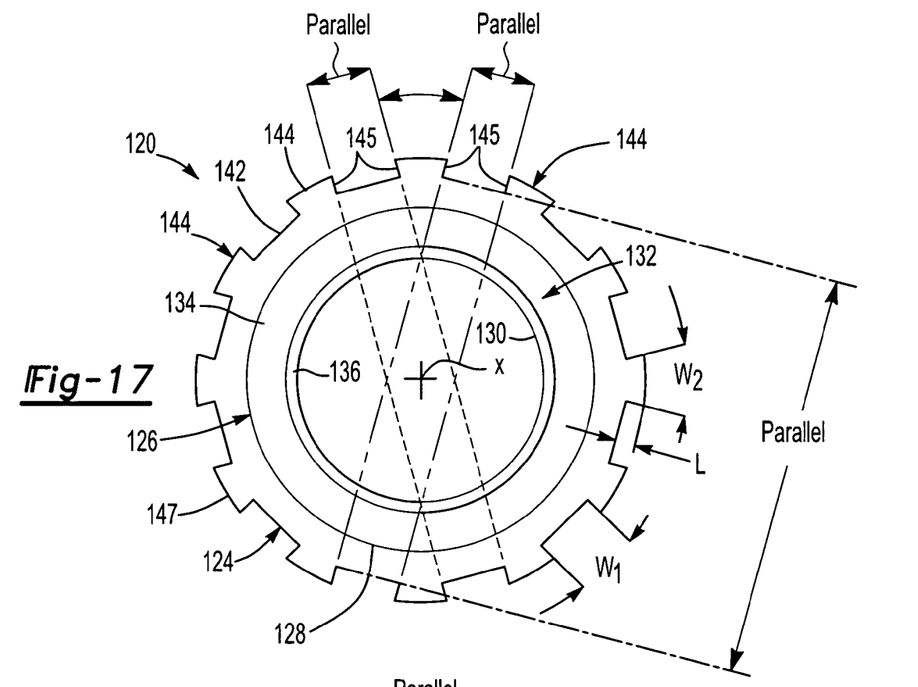
FIG. 17 is a top cross-sectional view of an alternative embodiment of the self-attaching fastener element of this invention.
Figures 19, 20:
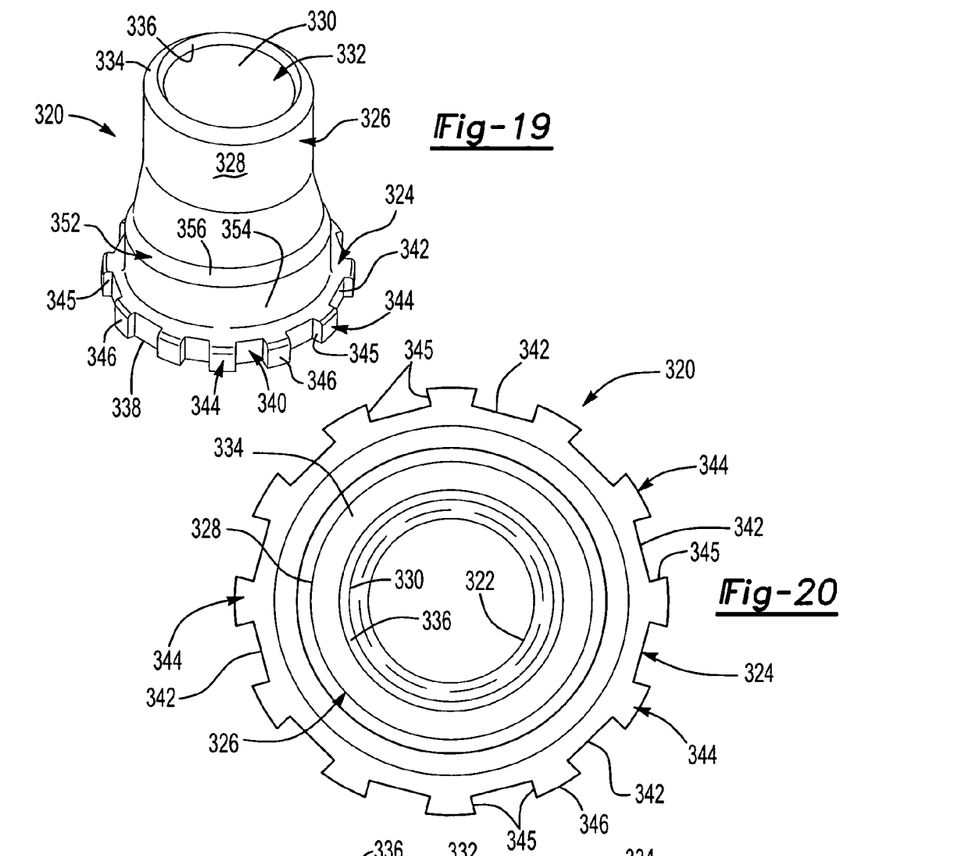
FIG. 19 is a top perspective view of an alternative embodiment of the self-attaching fastener of this invention in the form of a female fastener.
FIG. 20 is a top view of the female self-attaching fastener element illustrated in FIG. 19.
Figure 21:
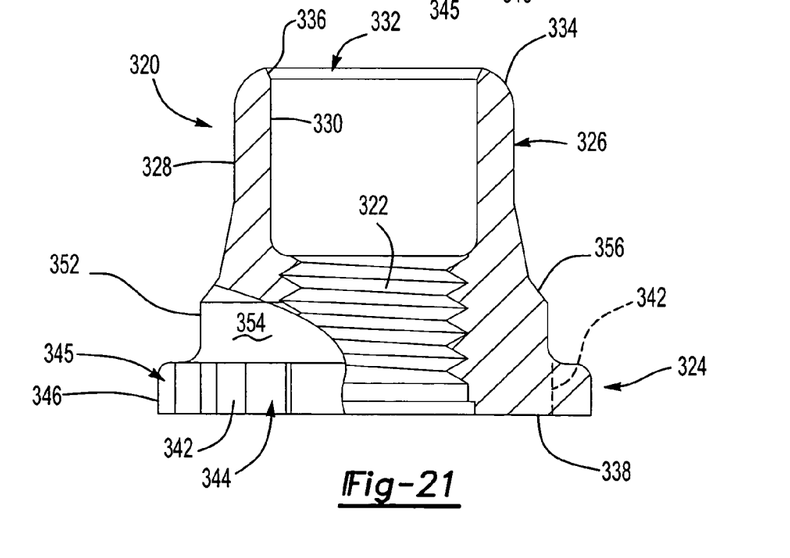
FIG. 21 is a side partially cross-sectioned view of the female self-attaching fastener element illustrated in FIGS. 19 and 20.

FIG. 17 illustrates an alternative preferred embodiment of the self-attaching fastener 120 of this invention, wherein the configuration of the radial projections 144 of the radial flange portion 124 has been modified for improved torque resistance. As described above with regard to FIGS. 1 to 3, the self-attaching fastener 120 includes a tubular barrel portion 126 having an arcuate outer surface 134 and an internal chamfered surface 136 and a radial flange portion 124 integral with the tubular barrel portion 126. As described further below, the self-attaching fastener element 120 may be a male fastener element having a shank portion (not shown) or a female fastener element having a bore as shown in FIGS. 19 to 21 described below. The radial projections 144 are circumferentially spaced and extend radially from an outer surface 142 of the radial flange portion 124, wherein the surfaces 142 between the radial projections 144 are preferably planar and generally perpendicular to a radius extending through the longitudinal axis "x" The radial projections 144 each include an outer surface 147 which, in a preferred embodiment, is cylindrical, but may be planar, as described above with regard to the self-attaching fastener element 20 shown in FIGS. 1 to 3. The radial projections 144 each include opposed planar generally radial side faces 145. However, in this embodiment, the generally radial planar side faces 145 of adjacent radial projections 144 are parallel as shown in FIG. 17 forming channel-shaped recesses between the radial projections 144 having a planar bottom wall 142 and opposed side faces 145 as shown in FIG. 17. Thus, when a torsional force is applied to the self-attaching fastener element 120 following installation in a metal panel, as described above, the panel metal deformed between the radial projections 144 will be deformed against the inclined planar side walls 145 and radially inwardly against the bottom wall 142 providing improved torque resistance.

As described above with regard to FIG. 2, the circumferential width $W_1$ of the outer surface 142 between adjacent radial projections 144 is preferably greater than the circumferential width $W_2$ of the outer surface 147 of the radial projections 144 and the circumferential width $W_2$ of the radial projections 144 is greater than the radial length L as shown in FIG. 17. Thus, it is believed that the self-attaching fastener element 120 will provide Superior torque resistance. Except for the configuration of the radial projections 144 described above, the self-attaching fastener element 120 may be identical to the self-attaching fastener element 20 described above or the self-attaching fastener element 120 may be a female fastener element as described below with regard to FIGS. 19 to 21. As will be noted, the elements of the self-attaching fastener element 120 have been numbered in the same sequence and thus no further explanation of the embodiment of the self-attaching fastener element 120 is required for a full understanding of this embodiment.

Figure 18:
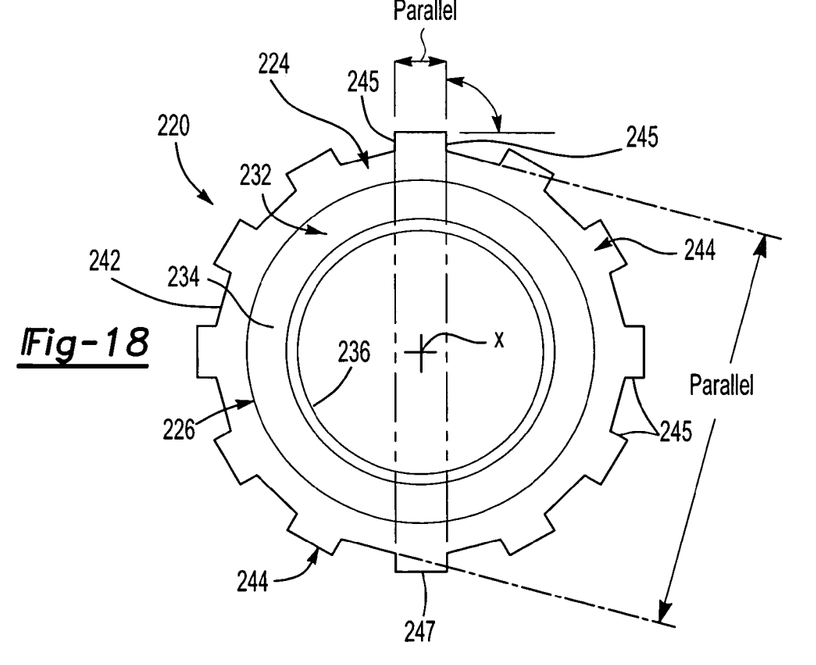
FIG. 18 is a top view of a third alternative embodiment of the self-attaching fastener element of this invention.

FIG. 18 discloses a second alternative embodiment of a self-attaching fastener element 220 of this invention. This embodiment of the self-attaching fastener element 220 may also be identical to the self-attaching fastener elements 120 and 20 described above except for the configuration of the radial projections 244 as described below. That is, the self-attaching fastener element 220 includes a tubular barrel portion 226 having a free open end 232, including an arcuate outer surface 234 and a chamfered internal surface 236. The radial flange portion 244 is integral with the tubular barrel portion 226, as described above, opposite the free open end 232. In this embodiment, the opposed planar generally radial side faces 245 of each of the radial projections 244 are parallel in FIG. 18. This configuration of the radial projections 244 is easier to form using a conventional broach and thus less expensive to manufacture. However, the generally radial planar side faces 245 of the radial projections 244 are also substantially perpendicular to a circumferential torsional load as described above, providing excellent torque resistance. Further, as described above with reference to FIGS. 2 and 17, the circumferential width of the outer surface 242 of the radial flange portion 244 is greater than the circumferential width of the outer surface 247 of the radial projections and the circumferential width of the outer surfaces 247 is greater than the radial length of the radial projections 244 providing significantly improved torque resistance over the known prior art. The elements of the self-attaching fastener element 220 may be otherwise identical to the fastener elements 120 and 20 described above and are numbered in the same sequence. Thus no further explanation of the self-attaching fastener element 220 is required for a full understanding of this embodiment.

FIGS. 19 to 21 illustrate a third alternative embodiment of the self-attaching fastener element 320 of this invention in the form of a female fastener, as now described. The self-attaching female fastener 320 shown in FIGS. 19 to 21 includes a bore 322, as shown in FIG. 21, which may be internally threaded or tapped or cylindrical to receive a thread forming or thread rolling male fastener (not shown). The self-attaching fastener 320 includes a radial flange portion 324 and a tubular barrel portion 326 having a cylindrical outer surface 328, a cylindrical inner surface 330 and a free open end 332. The open end 332 of the tubular barrel portion 326 includes an arcuate annular outer surface 334 and a chamfered inner surface 336. As described above, the arcuate annular outer surface 334 deforms a panel into a cavity of a die button against a center post as shown in FIG. 5 and the chamfered inner surface 336 may be utilized as a piercing surface but also contacts the outer surface of the die post reducing the force required for deforming the tubular barrel portion 326 radially outwardly as shown in FIGS. 10 to 13 and described above.

The radial flange portion 324 includes an outer surface 340 having a plurality of circumferentially spaced planar surfaces 342 extending generally perpendicular to a radius extending through the longitudinal axis of the self-attaching fastener 320 between a plurality of circumferentially spaced radial projections 344. Each of the radial projections 344 include planar generally radial side faces 345 and cylindrical end surfaces 346. As described above, the surfaces 342 of the radial flange portion 324 between the radial projections 344 may be arcuate, but planar surfaces are preferred and the outer surfaces 346 of the radial projections 344 may be planar, but are preferably arcuate, such that a circumferential projection of the outer surfaces 346 define a cylinder of revolution. In this embodiment of the self-attaching female fastener 320, the planar side faces 345 of the radial projections 344 are generally radial, but the planar side faces 345 are parallel as shown in FIG. 17. That is, the configuration of the radial projections 344 are substantially identical to the radial projections 44 shown in FIGS. 1 to 3. However, the planar generally radial side faces 345 of adjacent radial projections 344 may also be parallel, as shown in FIG. 17, forming channel-shaped recesses between the radial projections 344 or the planar generally radial side faces 344 of each of the radial projections 344 may be parallel, as shown in FIG. 18. A preferred embodiment of the self-attaching female fastener 320 includes a body portion 352 between the tubular barrel portion 326 and the radial flange portion 324 having a cylindrical outer surface 354 adjacent the radial portion 324 and an inwardly inclined frustoconical surface 356 joining the tubular barrel portion 326. Nevertheless, the tubular barrel portion 326 is integral with the radial flange portion 324.

As set forth above, the embodiments of the self-attaching fastener elements 120 and 220 shown in FIGS. 17 and 18 may be a male fastener element having a shank portion 22, as shown in FIGS. 1 to 3, or a female fastener element having a bore 322 as shown in FIG. 21. If the fastener elements 120 and 220 shown in FIGS. 17 and 18 are male fastener elements, the self-attaching fasteners are installed in a metal panel as shown in FIGS. 7 to 14, wherein the panel is incrementally deformed against and between the radial projections 144 or 244 and against the planar surfaces 142 and 242 as described above, providing excellent torque resistance for the fastener elements. If the self-attaching fastener element is a female fastener element as shown at 320 in FIGS. 19 to 21, an opening may be pierced through the panel during installation by a punch as described in the above-referenced U.S. Pat. No. 4,810,143.

Test results indicate that at least eight radial projections 44 are preferred as shown in FIGS. 1 to 3. However, depending upon the diameter of the radial flange portion, the self-attaching fastener element may include a greater number of radial projections 144 or 244, as shown in FIGS. 17 and 18, providing superior torque resistance. The number of radial projections can also be tuned to meet various torque requirements for a given self-attaching fastener element. Testing has also proven that a self-attaching fastener element having a plurality of circumferentially spaced radial projections each having planar, generally radial side faces meets or exceeds the torque requirements for this type of self-attaching fastener element. For example, a 6 MM male fastener element 20 of the type shown in FIGS. 1 to 3 with a radial flange portion 24 having eight radial projections 44 provided torque resistance up to 26 to 28 NM, which is significantly higher than the industrial standard of 14 NM. An 8 MM fastener element 20 having a radial flange portion 24 including eight radial projections 44 resulted in torque resistance of up to 42 to 44 NM, which is significantly greater than present industry standards of 34 nm. Greater torque resistance is also provided by self-attaching fasteners having 11 or more radial projections (144, 244) as shown in FIGS. 17 and 18. In many applications where the fastener element is a male fastener element as shown in FIGS. 1 to 3, 17 and 18, testing indicates that the shank portion will fail during testing of torque resistance following installation prior to rotational movement of the fastener element in a metal panel.

As will be understood from the above description of the preferred embodiments of the self-attaching fastener elements of this invention, various modifications may be made to the self-attaching fastener elements with the purview of the appended claims. As set forth above, the number of radial projections may be varied depending upon the torque requirements for the application. The self-attaching fastener element of this invention may be a male fastener element having a shank portion or a female fastener having a bore as described above. In a preferred embodiment of the self-attaching fastener element of this invention, the self-attaching fastener includes a radial flange portion and a tubular barrel portion coaxially aligned with the radial flange portion having a free open end opposite the radial flange portion and wherein the outer surface of the radial flange portion includes a plurality of circumferentially spaced radial projections each having planar, generally radial side faces, wherein the planar generally radial side faces extend generally perpendicular to a circumferential torsional force resulting from the application of torque to the fastener portion of the self-attaching fastener element, such as by applying a female fastener element to the shank portion 22 of the fastener element shown in FIGS. 1 to 3 or the bore 322 shown in FIGS. 19 to 21.

In a preferred embodiment, the circumferential width $W_1$ of the outer surface of the radial flange portion between the radial projections is substantially greater than the radial width $W_2$ of the outer surface of the radial projections and in a preferred embodiment, the circumferential width $W_1$ is at least twice the circumferential width $W_2$. Further, in a preferred embodiment of the self-attaching fastener of this invention, the radial length L is greater than the radial width $W_2$ of the radial projections. However, as set forth above, the planar generally radial side faces 45, 345 may be aligned with a radius extending through the axis "x" of the radial flange portion and tubular barrel portion as shown in FIGS. 1 to 3 and 19 to 21, the opposed planar generally radial side faces 245 may be parallel as shown in FIG. 18 or the planar generally radial side faces 145 of adjacent radial projections 144 may be parallel as shown in FIG. 17. As will be understood, the self-attaching fastener element, is preferably formed of steel and is preferably harder than the metal panel 50 to which it is attached.

The invention claimed is:

1. A self-attaching fastener element, comprising:
a tubular barrel portion having an open free end;
a radial flange portion integral with said tubular barrel portion opposite said open free end having an outer surface; and
said outer surface of said radial flange portion including a plurality of circumferentially spaced radial projections each including an outer surface having a diameter greater than said tubular barrel portion and said outer surface of said radial flange portion between said circumferentially spaced radial projections being planar and having a greater circumferential width than a circumferential width of said outer surface of said radial projections.

2. The self-attaching fastening element as defined in claim 1, wherein said circumferential width of said radial flange portion between said circumferentially spaced radial projections is at least twice said circumferential width of said outer surface of said radial projections.

3. The self-attaching fastening element as defined in claim 1, wherein said circumferential width of said outer surface of said circumferentially spaced radial projections is greater than a radial length of said circumferential ally spaced radial projections.

4. The self-attaching fastening element as defined in claim 3, wherein said circumferential width of said outer surface of said circumferentially spaced radial projections is at least twice said radial length of said circumferentially spaced radial projections.

5. The self-attaching fastening element as defined in claim 1, wherein said circumferentially spaced radial projections each have opposed planar generally radial side surfaces extending from said outer surface of said radial flange portion to said outer surface of said circumferentially spaced radial projections.

6. The self-attaching fastening element as defined in claim 5, wherein a radial projection of said opposed planar radial side surfaces of said circumferentially spaced projections extend through a longitudinal axis of said radial flange portion.

7. The self-attaching fastener element as defined in claim 5, wherein said opposed planar generally radial side surfaces of each of said circumferentially spaced radial projections are parallel.

8. The self-attaching fastening element, as defined in claim 5, wherein said opposed planar generally radial side surfaces of adjacent circumferentially spaced radial projections are parallel.

9. The self-attaching fastening element as defined in claim 1, wherein said outer surface of said circumferentially spaced radial projections is cylindrical.

10. The self-attaching fastening element as defined in claim 1, wherein said self-attaching fastening element is a female fastener having a bore through its longitudinal axis.

11. The self-attaching fastening element as defined in claim 10, wherein said female self-attaching fastening element includes a body portion between said tubular barrel portion and said radial flange portion having a diameter greater than said tubular barrel portion but less than said radial flange portion.

12. The self-attaching fastening element as defined in claim 1, wherein said self-attaching fastening element is a male self-attaching fastening element having a shank portion integral with said radial flange portion having a diameter less than said radial flange portion.

13. A self-attaching fastener element, comprising:

a tubular barrel portion baying a free open end;

a radial flange portion integral with said tubular barrel portion opposite said free open end having an outer surface; and said outer surface of said radial flange portion including a plurality of circumferentially spaced radial projections each including an outer surface and opposed planar generally radial side surfaces extending from said outer surface of said radial flange portion to an outer surface of said circumferentially spaced radial projections.

14. The self-attaching fastening element as defined in claim 13, wherein said outer surface of said radial flange portion between said circumferentially spaced radial projections has a greater circumferential width than a circumferential width of said outer surface of said radial projections.

15. The self-attaching fastening element as defined in claim 13, wherein a radial projection of said opposed planar generally radial side surfaces of said circumferentially spaced radial projections extends through a longitudinal axis of said radial flange portion.

16. The self-attaching fastening element as defined in claim 13, wherein said opposed planar generally radial side surfaces of adjacent circumferentially spaced radial projections are parallel.

17. The self-attaching fastening element as defined in claim 13, wherein said opposed planar generally radial side surfaces of each of said circumferentially spaced radial projections are parallel.

18. The self-attaching fastening element as defined in claim 13, wherein a circumferential width of said outer surface of said circumferentially spaced radial projections is greater than a radial length of said circumferentially spaced radial projections.

19. The self-attaching fastening element as defined in claim 13, wherein said outer surface of said radial flange portion between said circumferentially spaced radial projections is planar having a width greater than a circumferential width of said outer surface of said radial projections.

20. A self-attaching fastening element, comprising a tubular barrel portion having a free open end;

a radial flange portion integral with said tubular barrel portion opposite said free open end having an outer surface; and said outer surface of said radial flange portion including a plurality of circumferentially spaced radial projections each including an outer surface having a diameter greater than said tubular barrel portion and opposed planar generally radial side surfaces extending from said outer surface of said radial flange portion to said outer surface of said circumferentially spaced radial projections and said outer surface of said radial flange portion between said circumferentially spaced radial projections having a greater circumferential width than a circumferential width of said outer surface of said radial projections.

21. The self-attaching fastening element as defined in claim 20, wherein said circumferential width of said radial flange portion between said circumferentially spaced radial projections is at least twice said circumferential width of said outer surface of said radial projections.

22. The self-attaching fastening element as defined in claim 20, wherein said circumferential width of said outer surface of said circumferentially spaced radial projections is greater than a radial length of said circumferentially spaced radial projections.

23. The self-attaching fastening element as defined in claim 20, wherein a radial projection of said opposed planar generally radial side surfaces of said circumferentially spaced radial projections extend through a longitudinal axis of said radial flange portion.

24. The self-attaching fastening element as defined in claim 20, wherein said opposed planar generally radial side surfaces of each of said circumferentially spaced radial projections are parallel.

25. The self-attaching fastening element as defined in claim 20, wherein said opposed planar generally radial side surfaces of adjacent circumferentially spaced radial projections are parallel.

* * * * *